(12) United States Patent
Jayachandran et al.

(10) Patent No.: US 10,140,144 B2
(45) Date of Patent: *Nov. 27, 2018

(54) MULTI-SITE DISASTER RECOVERY CONSISTENCY GROUP FOR HETEROGENEOUS SYSTEMS

(71) Applicant: International Business Machines Corporation, Armonk, NY (US)

(72) Inventors: Praveen Jayachandran, Bangalore (IN); Shripad J. Nadgowda, New Delhi (IN); Akshat Verma, New Delhi (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 125 days.

This patent is subject to a terminal disclaimer.

(21) Appl. No.: 15/250,303

(22) Filed: Aug. 29, 2016

(65) Prior Publication Data

US 2016/0371158 A1    Dec. 22, 2016

Related U.S. Application Data

(63) Continuation of application No. 14/501,435, filed on Sep. 30, 2014, now Pat. No. 9,430,267.

(51) Int. Cl.
*G06F 9/455*    (2018.01)
*G06F 11/14*    (2006.01)
*G06F 8/65*    (2018.01)

(52) U.S. Cl.
CPC ............ *G06F 9/45558* (2013.01); *G06F 8/65* (2013.01); *G06F 9/45533* (2013.01); *G06F 11/1464* (2013.01); *G06F 2009/45595* (2013.01); *G06F 2201/805* (2013.01)

(58) Field of Classification Search
CPC .... G06F 8/65; G06F 9/45533; G06F 9/45558; G06F 11/1464; G06F 2009/45595; G06F 2201/805
USPC ....................................... 718/1; 717/168–178
See application file for complete search history.

(56) References Cited

U.S. PATENT DOCUMENTS

| 5,995,980 | A | 11/1999 | Olson et al. |
| 7,885,923 | B1 * | 2/2011 | Tawri ................. G06F 11/2064 707/610 |
| 8,108,337 | B2 | 1/2012 | Boyd et al. |
| 8,150,805 | B1 * | 4/2012 | Tawri ................. G06F 21/6218 707/610 |
| 8,290,899 | B2 | 10/2012 | Webman et al. |

(Continued)

*Primary Examiner* — Qing Chen
(74) *Attorney, Agent, or Firm* — Ference & Associates LLC (57) ABSTRACT

Methods and arrangements for managing a consistency group for computing sites. A plurality of computing sites contained within a consistency group are communicated with by using an aggregator, each of the plurality of computing sites comprising one or more of a virtual machine and a server. The aggregator acts as a central communication hub between the plurality of computing sites and combines data changes from the plurality of computing sites. Updates captured at each of the sites are received and the updates are batched. The updates are communicated, after the batching, to the plurality of computing sites, thereby ensuring data consistency across the plurality of sites. Other variants and embodiments are broadly contemplated herein.

18 Claims, 6 Drawing Sheets

(56) References Cited

U.S. PATENT DOCUMENTS

| | | | |
|---|---|---|---|
| 8,516,489 B2 | 8/2013 | Laverone et al. | |
| 8,965,861 B1 | 2/2015 | Shalla et al. | |
| 9,679,040 B1* | 6/2017 | Davis | G06F 17/30581 |
| 2002/0010767 A1* | 1/2002 | Farrow | H04L 12/24 |
| | | | 709/223 |
| 2006/0136685 A1 | 6/2006 | Griv et al. | |
| 2010/0218179 A1 | 8/2010 | Balascio et al. | |
| 2011/0113424 A1 | 5/2011 | Ewington et al. | |
| 2012/0254824 A1 | 10/2012 | Bansod | |
| 2013/0138615 A1 | 5/2013 | Gupta et al. | |
| 2014/0108339 A1 | 4/2014 | Marsden | |
| 2014/0189429 A1 | 7/2014 | Gill et al. | |
| 2015/0106802 A1 | 4/2015 | Ivanov et al. | |

* cited by examiner

MULTI-SITE DISASTER RECOVERY CONSISTENCY GROUP FOR HETEROGENEOUS SYSTEMS

CROSS REFERENCE TO RELATED APPLICATIONS

This application is a continuation application of U.S. patent application Ser. No. 14/501,435, now U.S. Pat. No. 9,430,267, filed on Sep. 30, 2014, and entitled "MULTI-SITE DISASTER RECOVERY CONSISTENCY GROUP FOR HETEROGENEOUS SYSTEMS," the contents of which are incorporated by reference herein.

BACKGROUND

As is generally known, a consistency group (CG) serves to group all system, middleware, and application volumes that are to be managed as a consistent entity. Among other settings, this can be of relevance in a hybrid cloud, which itself involves consolidation and management of a public cloud, private cloud and dedicated hardware. As is generally known, hypervisors can serve in the provision of consistency groups for VMs (virtual machines). It is also known that storage controllers can serve in the provision of block-level consistency groups.

However, several problems and shortcomings have been noted conventionally. Physical boundaries are encountered because hypervisors normally provide CGs solely for VMs within a privately managed virtualized environment, while the scope of a storage controller's CG is normally limited to hosts having attached storage (e.g., logical unit numbers or LUNs) provisioned by one or more controllers. Logical boundaries are usually encountered because CGs are conventionally facilitated only within a data center, a public cloud or a private cloud. Further, homogeneity emerges as a problem because it is difficult to provide CGs for applications spanning across VMs and physical machines.

BRIEF SUMMARY

In summary, one aspect of the invention provides a method of managing a consistency group for computing sites, said method comprising: utilizing at least one processor to execute computer code configured to perform the steps of: communicating, using an aggregator, with a plurality of computing sites contained within a consistency group, wherein each of the plurality of computing sites comprises one or more of: at least one virtual machine and at least one server; the aggregator acts as a central communication hub between the plurality of computing sites and combines data changes from the plurality of computing sites; receiving, using the aggregator, updates captured at each of the plurality of computing sites; batching, using the aggregator, the updates; and communicating, after the batching, the updates to the plurality of computing sites, thereby ensuring data consistency across the plurality of computing sites.

Another aspect of the invention provides an apparatus for managing a consistency group for computing sites, the apparatus comprising: at least one processor; and a computer readable storage medium having computer readable program code embodied therewith and executable by the at least one processor, the computer readable program code comprising: computer readable program code configured to communicate, using an aggregator, with a plurality of computing sites contained within a consistency group, wherein each of the plurality of computing sites comprises one or more of: at least one virtual machine; and at least one server; the aggregator acts as a central communication hub between the plurality of computing sites and combines data changes from the plurality of computing sites; computer readable program code configured to receive, using the aggregator, updates captured at each of the plurality of computing sites; computer readable program code configured to batch, using the aggregator, the updates; and computer readable program code configured to communicate, after the batching, the updates to the plurality of computing sites, thereby ensuring data consistency across the plurality of computing sites.

An additional aspect of the invention provides a computer program product for managing a consistency group for computing sites, the computer program product comprising: a computer readable storage medium having computer readable program code embodied therewith, the computer readable program code comprising computer readable program code configured to communicate, using an aggregator, wherein each of the plurality of computing sites comprises one or more of: at least one virtual machine; and at least one server; the aggregator acts as a central communication hub between the plurality of computing sites and combines data changes from the plurality of computing sites; computer readable program code configured to receive, using the aggregator, updates captured at each of the plurality of computing sites; computer readable program code configured to batch, using the aggregator, the updates; and computer readable program code configured to communicate, after the batching, the updates to the plurality of computing sites, thereby ensuring data consistency across the plurality of computing sites.

A further aspect of the invention provides a method comprising: providing an aggregator comprising a plurality of aggregators and wherein the plurality of aggregators feed data to a higher level aggregator in communication with a plurality of computing sites collectively forming a consistency group, each of the plurality of computing sites comprises one or more of (i) and (ii): (i) at least one virtual machine; and (ii) at least one server; receiving, at the aggregator, updates which are captured at each of the plurality of computing sites periodically, the updates comprising file system snapshots; batching, using the aggregator, the updates; and communicating, after the batching, the updates to the plurality of computing sites, thereby ensuring data consistency across the plurality of computing sites.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 6. In accordance with an exemplary embodiment, most if not all of the process steps, components and outputs discussed with respect to FIGS. 1-4 can be performed or utilized by way of a processing unit or units and system memory such as those indicated, respectively, at 16' and 28' in FIG. 6, whether on a server computer, a client computer, a node computer in a distributed network, or any combination thereof.

Broadly contemplated herein, in accordance with at least one embodiment of the invention, are methods and arrangements which provide systems heterogeneity at a primary site. Such heterogeneity can be manifested in terms of any and all of: operating systems, storage type (e.g., DAS, SAN, NAS), physical location (e.g., storage could be provisioned from different controllers at different sites), and server type (e.g., VM or Physical Server). (In the ensuing discussion, "server" may be understood to indicate a physical server as generally known in the computing arts.) Additionally, there are broadly contemplated herein methods and arrangements wherein a consistent state, comprising current states for a set of VMs or servers, are captured periodically and incrementally, and batched together at an aggregator. In this connection, and as broadly understood herein, this capturing involves capturing of current states with respect to each VM or server, and the captured states may be referred to as "updates" or "system updates". As such, during recovery, these batched updates can be applied to the set of VMs or servers to restore a consistent state relative to each other. Furthermore, it will be appreciated that there are broadly contemplated herein systems and arrangements which provide consistency groups across VMs and servers in cross-site/hybrid cloud environments using global coordination and local consistency. Additionally, methods and arrangements as broadly contemplated herein provide a CG for VMs or servers provisioned with a disk space from different storage types (e.g., DAS, NAS, SAN, vDisk). In accordance with various features broadly contemplated herein, local consistency can be ensured through incremental file system snapshots, and heterogeneity can be facilitated among members of a CG. These and other features relating to at least one embodiment of the invention will be better appreciated from the discussion which follows.

As generally understood herein, in accordance with at least one embodiment of the invention, a consistency group (CG) represents a grouping of all system, middleware and application volumes for which it is desired or required to be managed as a consistent entity. Among other benefits, CGs ensure that data are maintained in one form or another across the entire group, since considerations for such maintenance are different than in the case of data consistency at merely a database, file system or application level. Such benefits can be of advantage in settings such as disaster recovery, where data may remain consistent across one or more locations or volumes serving in a role of data backup.

Figure 1:
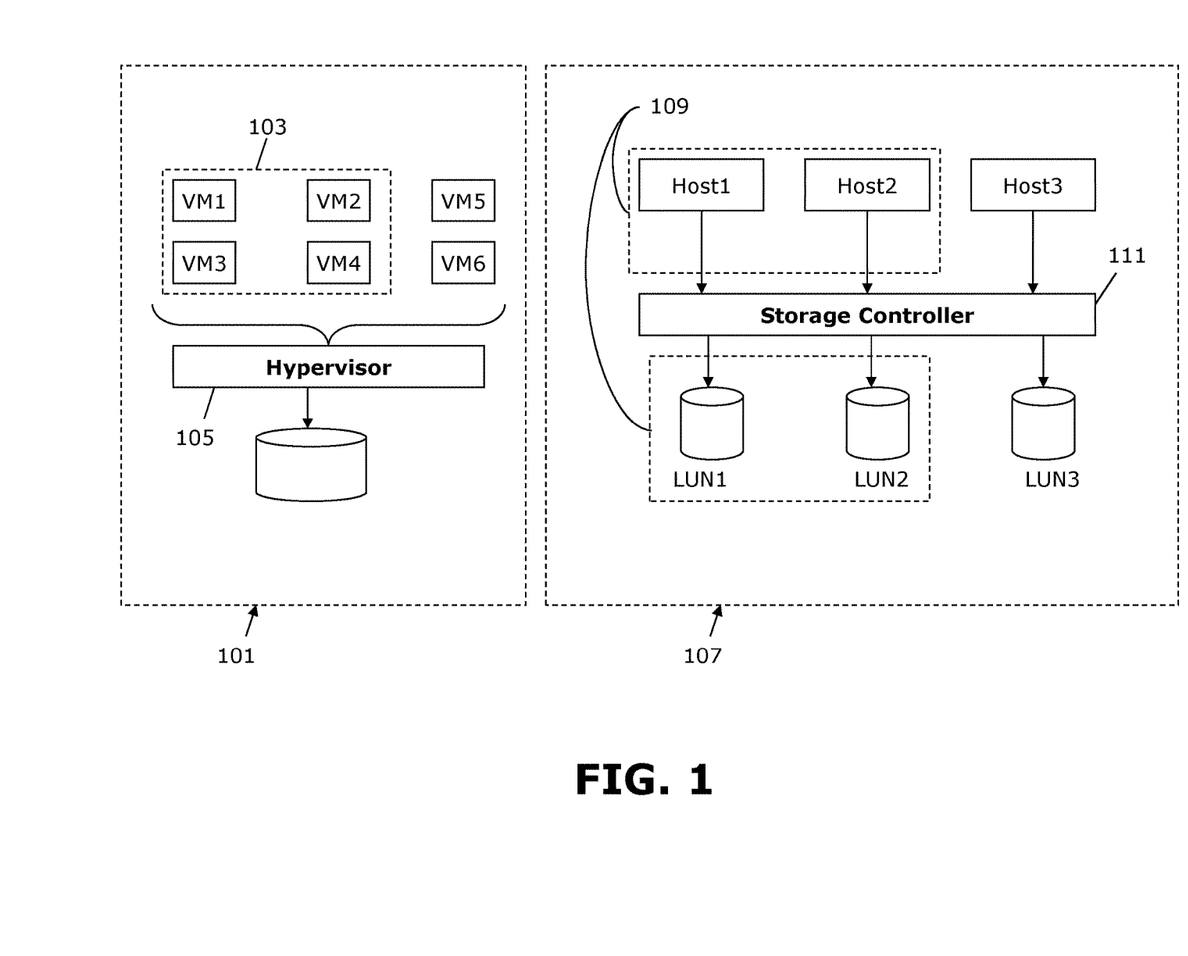
FIG. 1 illustrates conventional arrangements for providing consistency groups for virtual machines and with respect to storage controllers.

FIG. 1 illustrates conventional arrangements for providing consistency groups for virtual machines and with respect to storage controllers. As shown, in a first cloud setting 101, a CG 103 is defined with respect to several VMs run by a hypervisor 105, and in a second cloud setting 107 a CG 109 is defined with respect to hosts and LUNs provisioned or mediated by a storage controller 111. In both settings, design constraints inhibit further definition of CGs that might otherwise help impart greater utility. Generally, in cloud setups such as those indicated at 101 and 105, hardware (e.g., a hypervisor 109 or storage controller 111) is abstracted, so there is little or no control or access to the hardware. Inasmuch as a hybrid cloud requirement can involve hardware-agnosticity, even a cross-site CG requiring hardware access may well not work. Further, it is recognized that some solutions could be provided by embedding a snapshot feature in data paths. However, this may involve patching or updating a guest or host OS kernel, which can be difficult in a cloud setting; e.g., owing to standardization, cloud images can often be very restrictive and thus difficult to "intrude".

Figure 2:
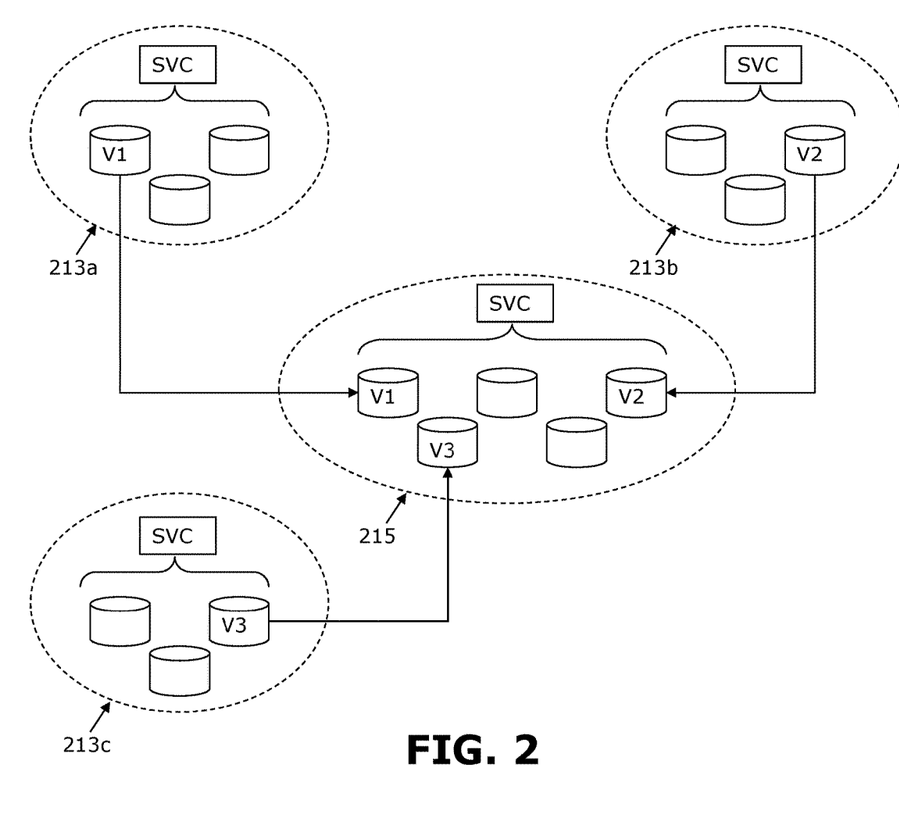
FIG. 2 schematically illustrates a conventional disaster recovery (DR) arrangement.

FIG. 2 schematically illustrates a conventional disaster recovery (DR) arrangement, by way of conveying additional challenges that may often be encountered. Such an arrangement can support DR wherein multiple primary sites can be mapped to a single secondary site. As shown, there are three sites 213a/b/c each including a SAN (storage area network) and SAN volume controller (SVC); storage volumes in the SAN are depicted by cylindrical shapes. (By way of a non-restrictive and illustrative example, International Business Machines of Armonk, N.Y., has developed a SVC that can be used as a block storage virtualization appliance.) Also shown is a DR site 215 including an SVC and SAN. Here, various volumes can be mirrored or duplicated at a DR site; e.g., V1 from site 213*a*, V2 from site 213*b* and V3 from site 213*c*. However, the inclusion of V1, V2 and V3 at site 215 does not correlate to being part of the same consistency group.

Figure 3:
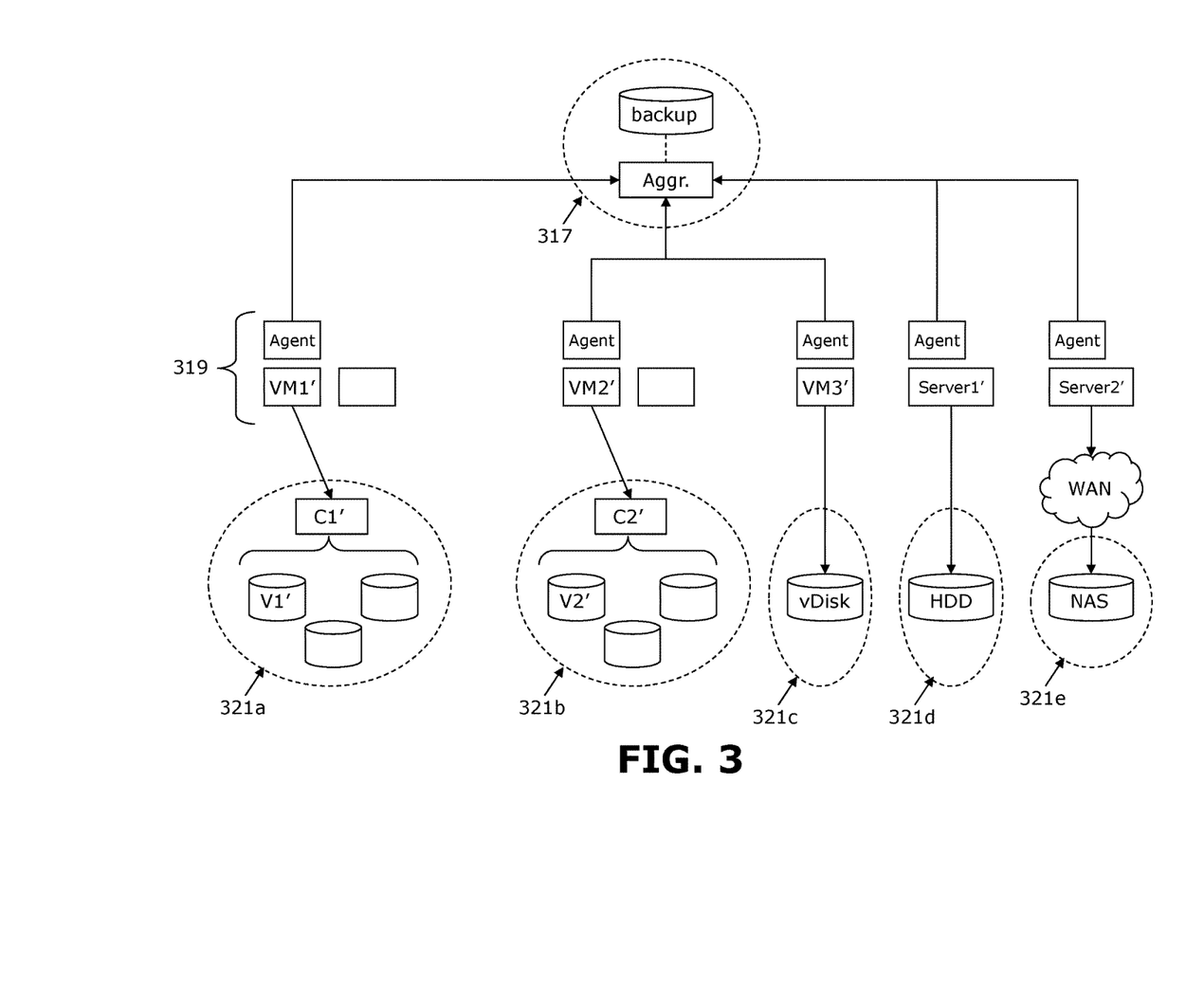
FIG. 3 schematically illustrates a hybrid consistency group in accordance with at least one embodiment of the invention.
Figure 4:
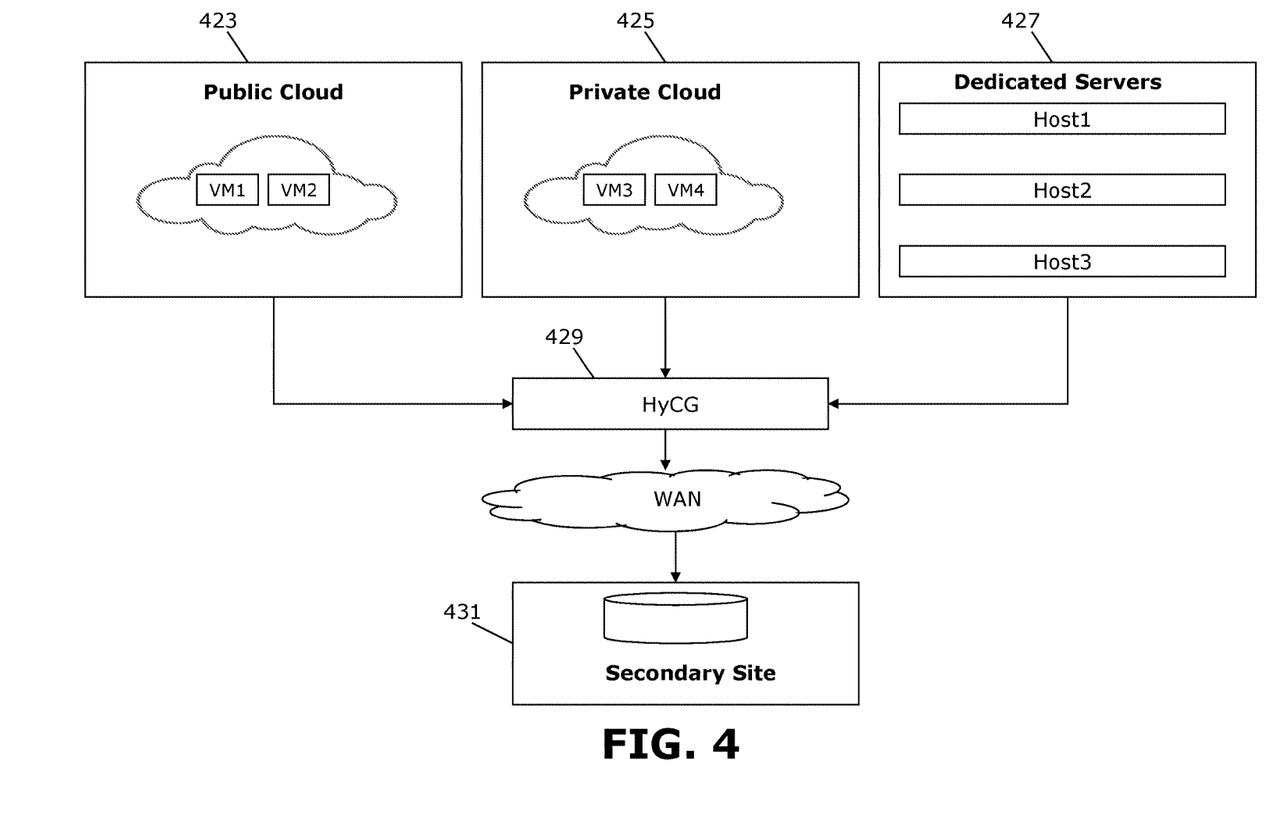
FIG. 4 schematically illustrates a variant embodiment of a hybrid consistency group in accordance with at least one embodiment of the invention.

FIG. 3 schematically illustrates a hybrid consistency group in accordance with at least one embodiment of the invention, while FIG. 4 schematically illustrates a variant embodiment of a hybrid consistency group. Reference may continue to be made to both figures throughout the ensuing discussion.

In accordance with at least one embodiment of the invention, in the example of FIG. 3, an aggregation site 317 for defining a hybrid CG is provided, and includes an aggregator and backup storage. By way of illustrative example, a plurality of sites 321*a/b/c/d/e* may each include various storage volumes or spaces that may each form a constituent part of the same CG. Thus, site 321*a* includes a controller C1' and volume V1', site 321*b* includes a controller C2' and volume V2'. On the other hand, in the present example, site 321*c* includes a virtual disk (vDisk), site 321*d* includes a high density disk (HDD), and site 321*e* includes network attached storage (NAS). A layer 319 is defined by virtual machines and servers that are each in communication with the respective sites as shown (wherein Server2' in particular communicates via a WAN [wide area network] with site 321*e*), and each of the VMs and servers is in communication with an agent which serves to capture system snapshots with respect to each site 321*a/b/c/d/e*.

In accordance with at least one embodiment of the invention, the example of FIG. 4 shows a different setting involving a public cloud 423, private cloud 425 and set of dedicated servers 427; each of these form part of a hybrid consistency group (HyCG) 429. Communication via a WAN affords a connection with a secondary storage site 431.

In accordance with at least one embodiment of the invention, consistent with the examples shown in FIGS. 3 and 4, it can be appreciated that a CG is built using two primitives, "local consistency" and "global co-ordination". For "local consistency", an agent at each site takes file system snapshots and replicates incremental snapshots. For "global co-ordination", agents running on VMs (or servers) participating in a CG will co-ordinate timing for taking snapshots; such coordination may be managed by the aggregator acting as a central communication hub. Deduplication can also be ensured via snapshot backup in any suitable form.

As such, in accordance with at least one embodiment of the invention, incremental file system snapshots are taken by an agent (e.g., at 319) running at each site (e.g., 321*a/b/c/d/e*) forming part of a CG. Changes with respect to a local file system can thereby be monitored, and change logs can also be stored upon every snapshot being taken. Thus, the change logs and the file system changes serve to maintain local consistency. Each individual agent will then process the change logs and data from its snapshot directory, and will notify an aggregator (e.g., at 317) once it finishes processing all the changes for a particular snapshot.

In accordance with at least one embodiment of the invention, incremental snapshots can also be made at an aggregator (e.g., at 317), with respect to the system snapshots batched there from the various sites. Further, if multiple aggregators are provided, consistency can be achieved in the same manner as discussed above with respect to individual agents and an aggregator; in other words, multiple aggregators may themselves feed data to another aggregator at a higher level of organizational hierarchy.

In accordance with at least one embodiment of the invention, an aggregator (e.g., at 317) receives, batches and deduplicates data changes with respect to all VMs and/or servers. Once it receives a marker (e.g., "END SNAPSHOT") from all the VMs and/or servers in the CG, it will take a snapshot of its own repository. Incremental backup (e.g., to the backup at site 317 in FIG. 3 or to secondary site 431 in FIG. 4) can be performed via recursive or relayed replication. Communication of the batched/deduplicated data changes from the aggregator (e.g., at 317) to all of the sites in the CG (e.g., at 321*a/b/c/d/e*) may then take place, thereby ensuring data consistency across all sites in the CG. While this can be performed under any suitable conditions, the value thereof may be appreciated in particular when restoring a consistent state throughout all sites in the CG in response to one or more disruptive events (i.e., one or more events that disrupt data at one or more of the sites), e.g., as a component of disaster recovery.

In accordance with at least one embodiment of the invention, quantitative scores and values as determined herein can be stored in memory or displayed to a user on a screen, as might fit the needs of one or more users.

Figure 5:
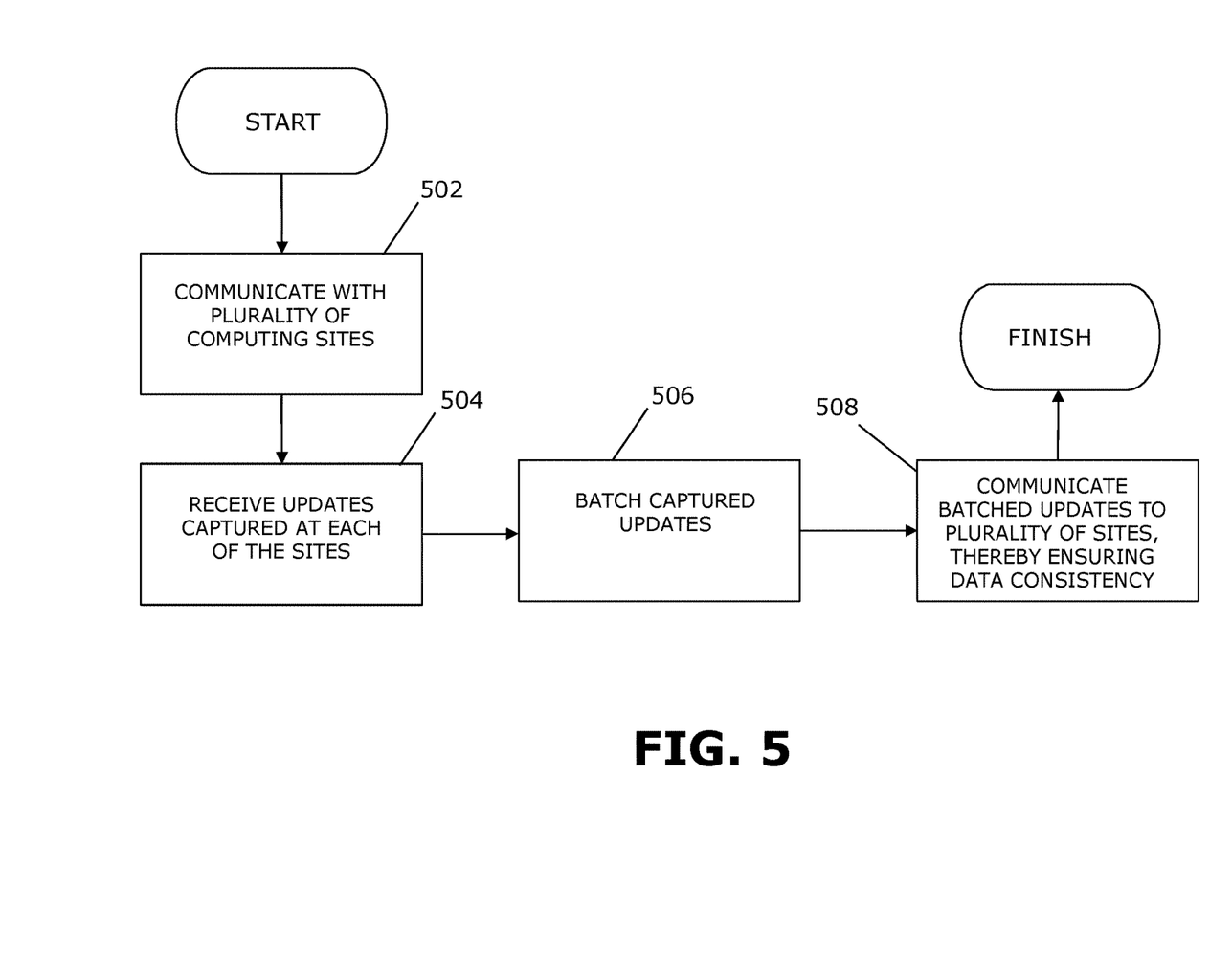
FIG. 5 sets forth a process more generally for managing a consistency group for computing sites.

FIG. 5 sets forth a process more generally for managing a consistency group for computing sites, in accordance with at least one embodiment of the invention. It should be appreciated that a process such as that broadly illustrated in FIG. 5 can be carried out on essentially any suitable computer system or set of computer systems, which may, by way of an illustrative and non-restrictive example, include a system such as that indicated at 12' in FIG. 6. In accordance with an example embodiment, most if not all of the process steps discussed with respect to FIG. 5 can be performed by way of a processing unit or units and system memory such as those indicated, respectively, at 16' and 28' in FIG. 6.

As shown in FIG. 5, in accordance with at least one embodiment of the invention, a plurality of computing sites are communicated with, each of the sites comprising one or more of (i) and (ii): (i) at least one virtual machine; and (ii) at least one server (502). Updates captured at each of the sites are received (504), and the captured updates are batched (506). The batched updates are communicated to the plurality of sites, thereby ensuring data consistency across the plurality of sites (508).

Figure 6:
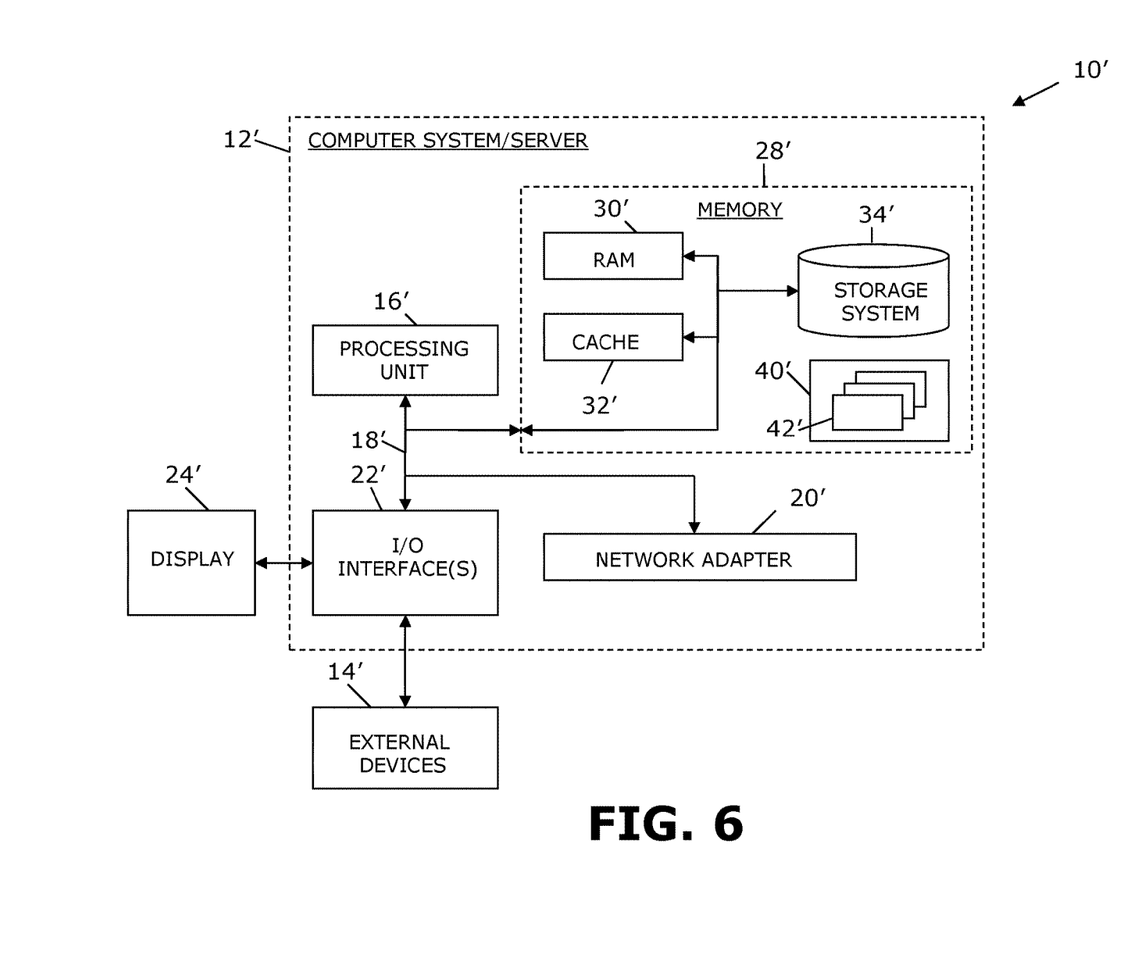
FIG. 6 illustrates a computer system.

Referring now to FIG. 6, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited took, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of managing a consistency group for computing sites, said method comprising:
    utilizing at least one processor to execute computer code configured to perform the steps of:
    communicating, using an aggregator, with a plurality of computing sites contained within a consistency group, wherein each of the plurality of computing sites comprises one or more of: at least one virtual machine and at least one server;
    the aggregator acts as a central communication hub between the plurality of computing sites and combines data changes from the plurality of computing sites;
    receiving, using the aggregator, updates captured at each of the plurality of computing sites, wherein, at each of the plurality of computing sites, the updates are captured via file system snapshots, and wherein the receiving updates comprises receiving the file system snapshots as replicated incremental snapshots;
    the aggregator coordinates timing for capturing the updates via the file system snapshots across the plurality of computing sites;
    batching, using the aggregator, the updates into batched updates, wherein the batching the updates comprises de-duplicating the received updates by removing redundant updates from the received updates; and
    communicating, after the batching the updates, the batched updates to the plurality of computing sites, thereby ensuring data consistency across the plurality of computing sites.

2. The method according to claim 1, wherein the updates comprise updates captured periodically.

3. The method according to claim 2, wherein the updates comprise updates captured periodically and incrementally.

4. The method according to claim 1, wherein the aggregator comprises a plurality of aggregators, and wherein the plurality of aggregators feed data to a higher level aggregator.

5. The method according to claim 1, wherein the file system snapshots comprise snapshots taken periodically.

6. The method according to claim 5, wherein the file system snapshots comprise snapshots taken periodically and incrementally.

7. The method according to claim 1, comprising coordinating timing of the file system snapshots across the plurality of computing sites.

8. The method according to claim 1, wherein the updates are received from a plurality of agents associated with the plurality of computing sites.

9. The method according to claim 1, wherein said communicating the batched updates is performed in restoring a consistent state responsive to one or more disruptive events.

10. The method according to claim 9, wherein said restoring is performed as a component of disaster recovery.

11. The method according to claim 1, comprising storing the updates in a backup storage in communication with the aggregator.

12. The method according to claim 1, comprising taking a file system snapshot at the aggregator upon said batching of the updates.

13. An apparatus for managing a consistency group for computing sites, said apparatus comprising:
    at least one processor; and
    a computer readable storage medium having computer readable program code embodied therewith and executable by the at least one processor, the computer readable program code comprising:
    computer readable program code configured to communicate, using an aggregator, with a plurality of computing sites contained within a consistency group, wherein each of the plurality of computing sites comprises one or more of: at least one virtual machine and at least one server;
    the aggregator acts as a central communication hub between the plurality of computing sites and combines data changes from the plurality of computing sites;
    computer readable program code configured to receive, using the aggregator, updates captured at each of the plurality of computing sites, wherein, at each of the plurality of computing sites, the updates are captured via file system snapshots, and wherein the receiving updates comprises receiving the file system snapshots as replicated incremental snapshots;
    the aggregator coordinates timing for capturing the updates via the file system snapshots across the plurality of computing sites;
    computer readable program code configured to batch, using the aggregator, the updates into batched updates, wherein the batching the updates comprises de-duplicating the received updates by removing redundant updates from the received updates; and
    computer readable program code configured to communicate, after the batching the updates, the batched updates to the plurality of computing sites, thereby ensuring data consistency across the plurality of computing sites.

14. A computer program product for managing a consistency group for computing sites, said computer program product comprising:
    a computer readable storage medium having computer readable program code embodied therewith, the computer readable program code comprising:
    computer readable program code configured to communicate, using an aggregator, with a plurality of computing sites contained within a consistency group, wherein each of the plurality of computing sites comprises one or more of: at least one virtual machine and at least one server;
    the aggregator acts as a central communication hub between the plurality of computing sites and combines data changes from the plurality of computing sites;
    computer readable program code configured to receive, using the aggregator, updates captured at each of the plurality of computing sites, wherein, at each of the plurality of computing sites, the updates are captured via file system snapshots, and wherein the receiving updates comprises receiving the file system snapshots as replicated incremental snapshots;
    the aggregator coordinates timing for capturing the updates via the file system snapshots across the plurality of computing sites;
    computer readable program code configured to batch, using the aggregator, the updates into batched updates, wherein the batching the updates comprises de-duplicating the received updates by removing redundant updates from the received updates; and
    computer readable program code configured to communicate, after the batching the updates, the batched updates to the plurality of computing sites, thereby ensuring data consistency across the plurality of computing sites.

15. The computer program product according to claim 14, wherein the updates comprise updates captured periodically.

16. The computer program product according to claim 14, wherein the updates comprise updates captured periodically and incrementally.

17. The computer program product according to claim 14, wherein the aggregator comprises a plurality of aggregators, and wherein the plurality of aggregators feed data to a higher level aggregator.

18. A method of managing a consistency group for computing sites, said method comprising:
    utilizing at least one processor to execute computer code configured to perform the steps of:
    providing an aggregator comprising a plurality of aggregators, wherein the plurality of aggregators feed data to a higher level aggregator in communication with a plurality of computing sites collectively forming a consistency group, and wherein each of the plurality of computing sites comprises one or more of (i) and (ii):
    (i) at least one virtual machine; and
    (ii) at least one server;
    the aggregator acts as a central communication hub between the plurality of computing sites and combines data changes from the plurality of computing sites;
    receiving, using the aggregator, updates which are captured at each of the plurality of computing sites periodically, wherein the updates comprise file system snapshots, and wherein the receiving updates comprises receiving the file system snapshots as replicated incremental snapshots;
    the aggregator coordinates timing for capturing the updates via the file system snapshots across the plurality of computing sites;
    batching, using the aggregator, the updates into batched updates, wherein the batching the updates comprises de-duplicating the received updates by removing redundant updates from the received updates; and
    communicating, after the batching the updates, the batched updates to the plurality of computing sites, thereby ensuring data consistency across the plurality of computing sites.

* * * * *